UNITED STATES PATENT OFFICE.

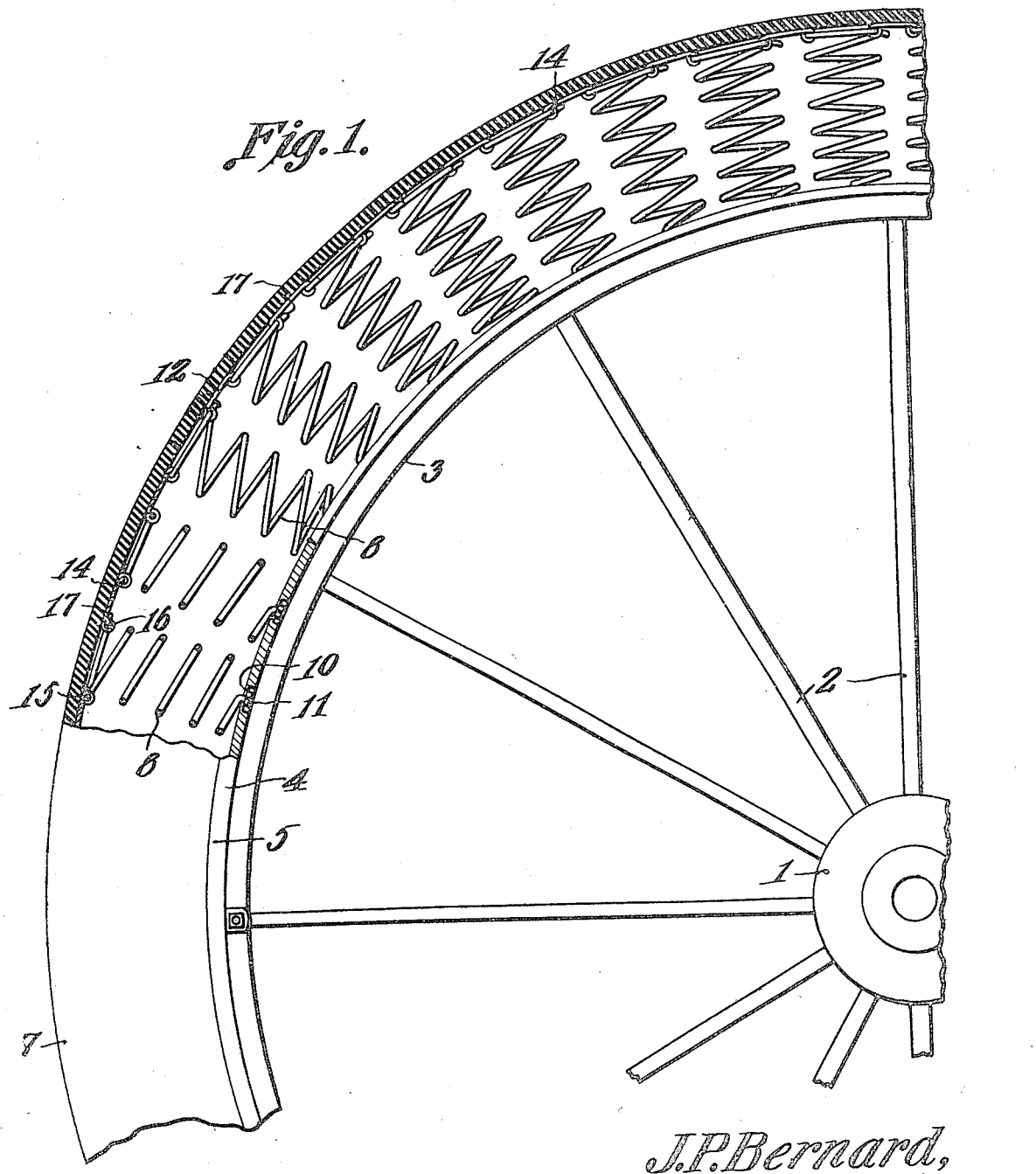

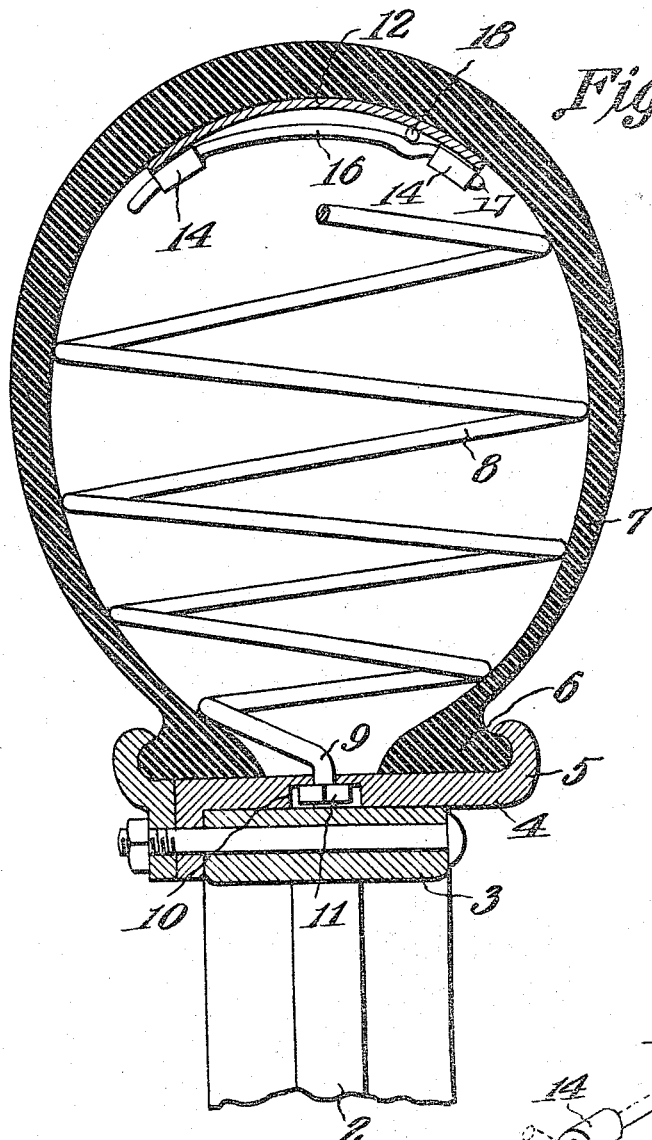
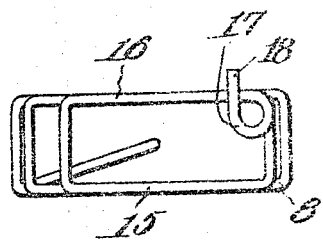
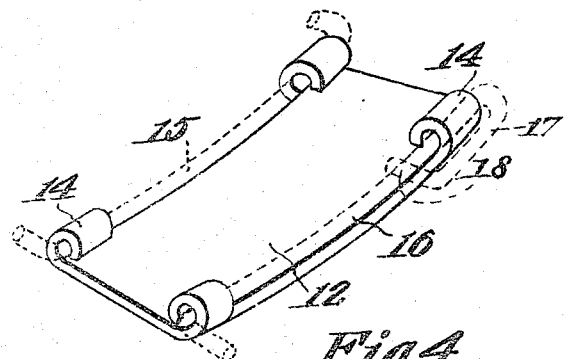

JOHN P. BERNARD, OF OROSI, CALIFORNIA.

SPRING-TIRE.

1,150,736.

Specification of Letters Patent.

Patented Aug. 17, 1915.

Application filed February 18, 1914. Serial No. 819,555.

*To all whom it may concern:*

Be it known that I, JOHN P. BERNARD, a citizen of the United States, residing at Orosi, in the county of Tulare and State of California, have invented a new and useful Spring-Tire, of which the following is a specification.

The device forming the subject matter of this application is a spring tire, and one object of the present invention is to provide a device of this type in which pneumatic elements subject to puncture and damage may be dispensed with.

Another object of the invention is to provide novel means for assembling the springs which afford the necessary resiliency, with the rim and with connections which bear against the under face of a casing.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows in side elevation, a portion of a tire constructed in accordance with the present invention, the same being applied to a wheel, and parts being shown in section; Fig. 2 is a radial section of the structure depicted in Fig. 1; Fig. 3 is a plan view of one of the springs; Fig. 4 is a perspective view illustrating one of the connections.

In the accompanying drawings a hub is shown and indicated by the reference character 1, the numeral 2 indicating the spokes which are connected with a main rim 3 of any desired construction.

The invention further includes a demountable rim 4, of any desired form, the same in the present instance, although not of necessity being depicted as comprising clencher flanges 5 adapted to engage clencher beads 6 on a casing 7. The casing is a yieldable structure, made of canvas, leather, rubber or the like and it is to be understood that the casing may be connected with the demountable rim 4 in any desired manner.

Located within the casing 7 are helical springs 8. The inner end of each helical spring 8, indicated at 9, passes through the demountable rim 4 and may be received in a recess 10 formed in the under face of the demountable rim, there being a nut 11 or the like applied to the inner end 9 of the spring, so as to hold the same in place. The several springs 8 are spaced apart circumferentially of the wheel, as clearly shown in Fig. 1, to the end that the edges of the springs may not come into contact with each other when the casing 7 yields. As clearly indicated in Figs. 3 and 2, the springs taper from their central portions toward their ends, so that the convolutions of the spring may conform properly to the intrados of the yieldable casing 7.

The outer convolutions of the springs 8 are united by connections, one of which connections is shown in Fig. 4 and is there denoted by the reference character 12. Each connection 12 preferably is in the form of a metal plate, shaped to conform properly to the inner face of the casing 7. Adjacent its corners, each connection 12 is provided with eyes 14, the same being formed preferably by bending integral tongues fashioned on the connection 12, into the proper configuration.

One side 15 of the outer convolution of each spring 8 passes through one pair of the eyes on one connection 12 and the other side 16 of the outer convolution of the spring passes through one of the eyes 14 on the next convolution, the side 16 of the convolution of the spring terminating in an eye 17 which is engaged in the fourth eye 14 on the plate or connection 12. This eye 17 terminates in a rectangularly disposed finger 18. The finger 18 passes between the part 16 of the outer convolution of the spring and the connection 12 and thus the finger is bound and held in place. Further, the finger is thus disposed beneath the connection 12 and can not puncture or injure the casing 7.

As will be understood readily, the springs 8 will yield and afford the necessary resiliency in the structure. The connections 12 bridge the space existing between the outer ends of the helical springs 8 and by the construction above outlined, a substantially continuous tread support for the outer portion of the casing 7 is provided.

Having thus described the invention, what I claim is:—

1. In a device of the class described, a rim; a casing assembled with the rim; helical springs exerting a thrust upon the rim and having outer rectangular convolutions which support the casing; and a single plate located between the outer convolutions of the respective springs, the entire outer face of the plates bearing against the casing and coöperating with the outer rectangular convolutions of the springs throughout the widths of said convolutions to form a longitudinally continuous support for the casing, the plates being provided along their transverse edges with inwardly projecting eyes which engage adjacent transverse parts of the outer convolutions of adjoining springs pivotally and engage the longitudinal parts of said convolutions to prevent a lateral shifting of the plate.

2. In a device of the class described, a rim; a casing assembled with the rim; helical springs attached to the rim and having outer convolutions which support the casing; and plates located between the outer convolutions of the respective springs, the entire outer faces of the plates bearing against the casing and coöperating with the outer convolutions of the springs to form a longitudinally continuous support for the casing, the plates being provided along their transverse edges with inwardly projecting eyes which engage adjacent parts of the outer convolutions of adjoining springs, one end of the outer convolution of each spring being formed into a loop engaged with one eye, the end of the loop being extended beneath one of the plates.

3. In a device of the class described, a rim; a casing assembled with the rim; helical springs attached to the rim and having outer convolutions which support the casing; and plates located between the outer convolutions of the respective springs, the entire outer faces of the plates bearing against the casing and coöperating with the outer convolutions of the springs to form a longitudinally continuous support for the casing, the plates being provided along their transverse edges with inwardlly projecting eyes which engage adjacent parts of the outer convolutions of adjoining springs, the end of the outer convolution of each spring being formed into a loop engaged with one eye, the end of the loop being extended beneath one plate and being pinched between said plate and the outer convolution of which the loop forms a part.

In testimony that I claim the foregoing as my own, I have hereto affixed my signature in the presence of two witnesses.

JOHN P. BERNARD.

Witnesses:
  EDWARD W. KELLEY,
  BYRON M. PRICE.